United States Patent
Chapman et al.

(10) Patent No.: US 9,247,310 B2
(45) Date of Patent: Jan. 26, 2016

(54) DOCSIS OUT-OF-BAND CONTROL SIGNAL FREQUENCY CONVERSION FOR LEGACY SET-TOP BOXES

(75) Inventors: John T. Chapman, Laguna Nigel, CA (US); Mark A. Palazzo, San Jose, CA (US)

(73) Assignee: Cisco Technologies, Inc., San Jose, CA (US)

( * ) Notice: Subject to any disclaimer, the term of this patent is extended or adjusted under 35 U.S.C. 154(b) by 235 days.

(21) Appl. No.: 13/472,691

(22) Filed: May 16, 2012

(65) Prior Publication Data

US 2013/0276047 A1    Oct. 17, 2013

Related U.S. Application Data

(60) Provisional application No. 61/623,879, filed on Apr. 13, 2012.

(51) Int. Cl.
| | |
|---|---|
| *H04N 21/426* | (2011.01) |
| *H04N 21/61* | (2011.01) |
| *H04N 21/65* | (2011.01) |
| *H04N 7/173* | (2011.01) |
| *H04N 21/6543* | (2011.01) |
| *H04N 21/6547* | (2011.01) |
| *H04N 7/10* | (2006.01) |

(52) U.S. Cl.
CPC .............. *H04N 21/6118* (2013.01); *H04N 7/10* (2013.01); *H04N 21/42676* (2013.01); *H04N 21/6543* (2013.01); *H04N 21/6547* (2013.01)

(58) Field of Classification Search
CPC ....... H04N 21/60; H04N 21/63; H04N 21/65; H04N 21/6118; H04N 21/6168; H04N 21/42676; H04N 21/239; H04N 21/2408; H04N 21/44245; H04N 7/17309
USPC .................................................. 725/111, 105
See application file for complete search history.

(56) References Cited

U.S. PATENT DOCUMENTS

| | | | |
|---|---|---|---|
| 7,372,872 B2 | 5/2008 | Danzig et al. | |
| 7,716,711 B1 | 5/2010 | Weinstein et al. | |
| 7,937,739 B2 * | 5/2011 | Shani et al. | 725/118 |
| 8,181,208 B1 * | 5/2012 | Elwardani | 725/82 |
| 2002/0108120 A1 | 8/2002 | Bahraini et al. | |
| 2003/0159153 A1 * | 8/2003 | Falvo et al. | 725/110 |
| 2005/0235333 A1 * | 10/2005 | Bertonis et al. | 725/111 |
| 2005/0283816 A1 * | 12/2005 | Weinstein et al. | 725/129 |

(Continued)

OTHER PUBLICATIONS

2010 Spring Techical Forum Proceedings—David Urban (pp. 153-178).*

(Continued)

*Primary Examiner* — Benjamin R Bruckart
*Assistant Examiner* — Aklil Tesfaye
(74) *Attorney, Agent, or Firm* — Edell, Shapiro & Finnan, LLC

(57) ABSTRACT

Techniques are provided for up-converting a downstream set-top box control signal to a frequency that is above a cable television system upstream communications band. The downstream set-top box control signal is down-converted to a frequency in a set-top box control band and injected into a set-top box communications pathway. The downstream set-top box control signal may be up-converted from baseband or from the set-top box control band to a frequency in cable television system downstream communications band and transmitted on a DOCSIS RF channel.

28 Claims, 7 Drawing Sheets

(56) References Cited

U.S. PATENT DOCUMENTS

| | | | |
|---|---|---|---|
| 2007/0050835 A1* | 3/2007 | Liva et al. | 725/129 |
| 2007/0294738 A1* | 12/2007 | Kuo et al. | 725/116 |
| 2010/0316384 A1* | 12/2010 | Sucharczuk et al. | 398/79 |
| 2011/0255452 A1* | 10/2011 | Brooks | 370/297 |
| 2011/0296481 A1* | 12/2011 | Cholas et al. | 725/109 |

OTHER PUBLICATIONS

"Intelligent Systems for Future Generation Wireless Networks", Guest Editors: Park et al., EURASIP Journal on Wireless Communications and Networking, 2008, 169 pages.

* cited by examiner

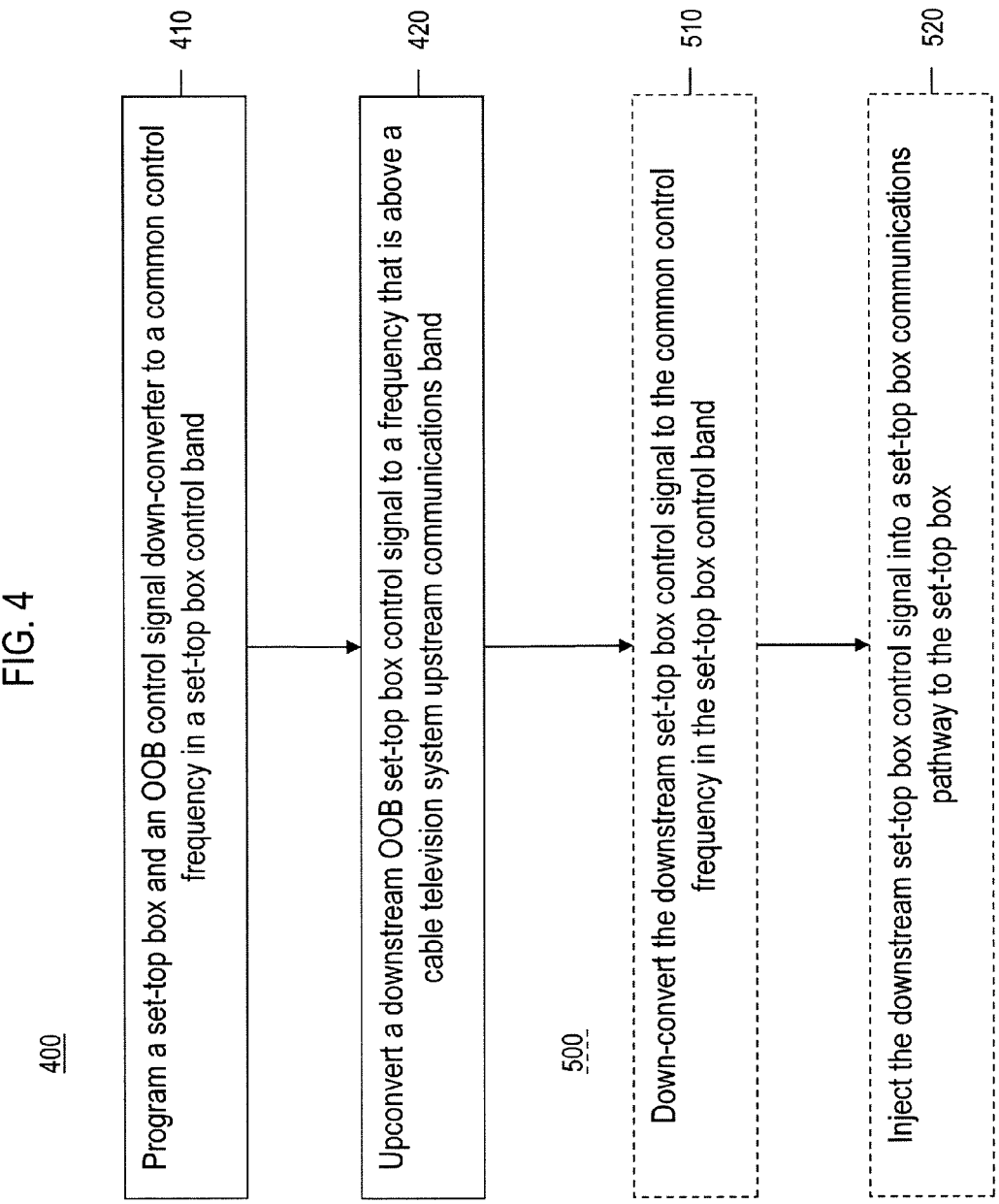

US 9,247,310 B2

DOCSIS OUT-OF-BAND CONTROL SIGNAL FREQUENCY CONVERSION FOR LEGACY SET-TOP BOXES

This application claims the benefit of U.S. Provisional Application No. 61/623,879, filed Apr. 13, 2012, which is incorporated herein by reference in its entirety.

TECHNICAL FIELD

The present disclosure relates to accommodating out-of-band signaling for legacy set top boxes when Data-Over-Cable Service Interface Specification (DOCSIS) is employed.

BACKGROUND

DOCSIS is a protocol that is used to send digital video and data between a hub or headend facility (HEF), and a cable modem (CM) and/or a set-top box at a customer premise. Motion Picture Experts Group (MPEG)-transport stream (TS) based digital video is generally a one-way or downstream application from the head-end to the set-top box. Internet protocol (IP) based video streams today are also predominantly from the head end to the set-top box. However, IP video streams may also be sent from the home environment to the head-end, i.e., IP video may be sent upstream.

Control information for a legacy MPEG-TS stream can be both one-way and two-way, e.g., downstream or both downstream and upstream. For basic video services, a single downstream broadcast control channel is sufficient. For many legacy set-top boxes, the control channel consists of an out-of-band (OOB) carrier located at or near 75 MHz in the downstream spectrum.

For downstream and upstream transport, the digital data are modulated onto a Radio Frequency (RF) carrier or channel using Quadrature Amplitude Modulation (QAM) techniques. DOCSIS version 3.0 expands DOCSIS capability beyond a single RF carrier to multiple RF carriers using a technique known as channel bonding in order to reduce latency and/or to increase the capacity or traffic burst capability for a particular service flow. Channel bonding essentially uses packet multiplexing across two or more RF carriers.

As users begin to send more data upstream, e.g., by exchanging photographs or movies, increased demands are placed on the upstream bandwidth. Cable system operators have been looking for ways to increase upstream capacity. Part of the solution has been channel bonding as described above. However, legacy cable system components were not designed with the increasing demands of modern cable system end users for both upstream and downstream traffic.

BRIEF DESCRIPTION OF THE DRAWINGS

The features and advantages of DOCSIS OOB control signal frequency conversion for legacy set-top boxes (STBs) of the present disclosure will become apparent upon consideration of the following description of example embodiments thereof, particularly when taken in conjunction with the accompanying drawings wherein like reference numerals in the various figures are utilized to designate like components.

FIG. 4 is an example procedural flowchart illustrating the manner in which a legacy STB OOB control signal frequency conversion may be implemented.

DESCRIPTION OF EXAMPLE EMBODIMENTS

Overview

Techniques are provided herein for up-converting a downstream set-top box (STB) control signal to a frequency that is above a cable television system upstream communications band such as a DOCSIS upstream band. The downstream STB control signal may be up-converted from baseband or from the STB control band to a frequency in a cable television downstream communications band. The downstream STB control signal is then later down-converted to a frequency in a STB control band and injected into a STB communications pathway.

Example Embodiments

Figure 1:
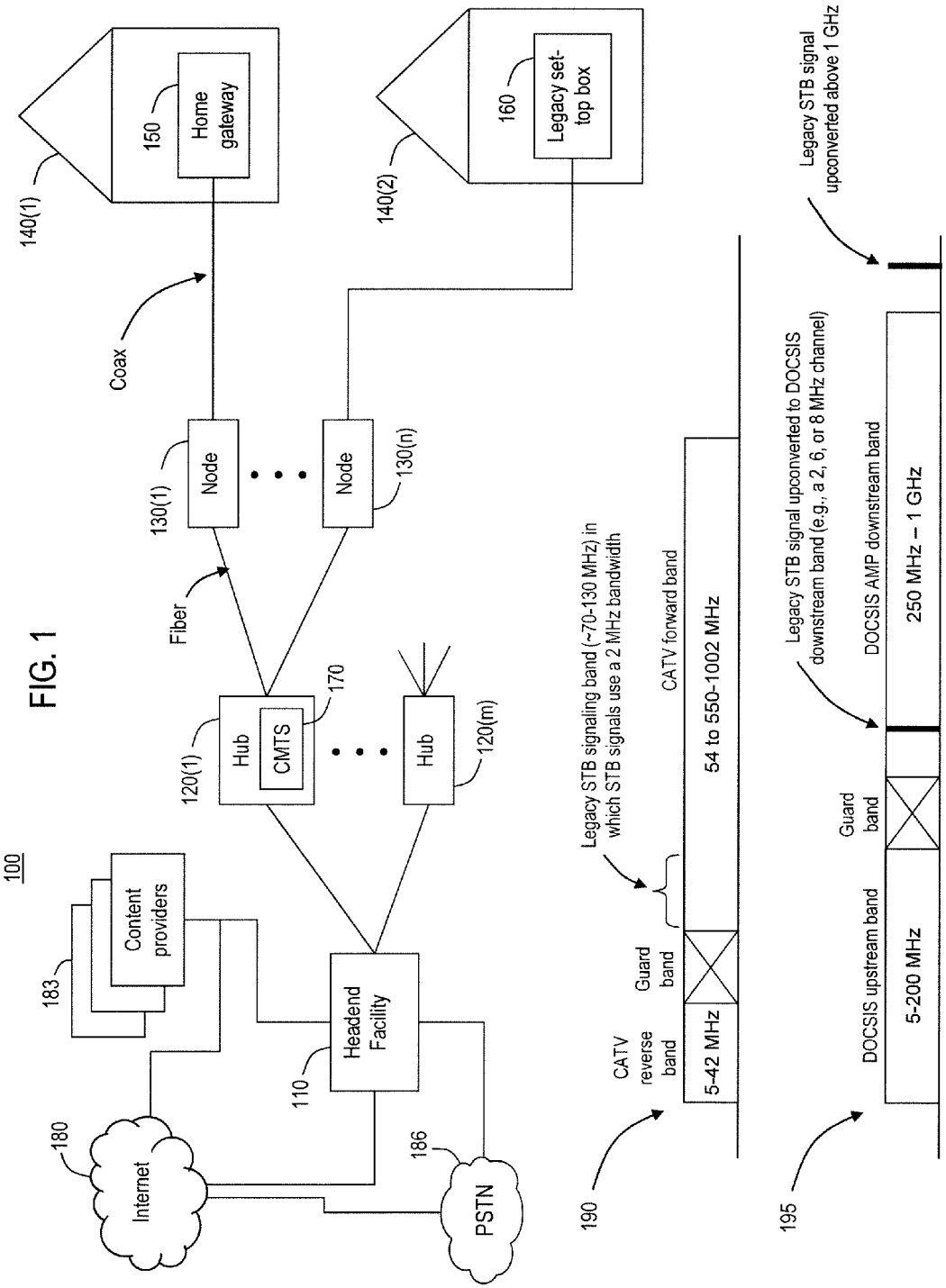
FIG. 1 is an example block diagram of a cable television distribution system employing legacy STB OOB control signal frequency conversion.

Referring to FIG. 1, an example cable system or network 100 is shown. Specifically, the system 100 includes a headend facility (HEF) 110, a plurality of hubs 120(1)-120(m), a plurality of nodes 130(1)-130(n), and customers 140(1) and 140(2). Each of the hubs 120 or HEF 110 may have a cable modem termination system (CMTS) such as CMTS 170 shown in hub 120(1). Customer 140(1) has a residential or home gateway 150 and customer 140(2) has a legacy MPEG-TS STB 160. Each customer 140 may have combinations of any equipment described herein. A separate device in system 100 typically generates legacy set-top box control signals. Optionally, the device for generating legacy set-top box control signals may be located within Hub 120(1) or HEF 110. These control signals have traditionally been mixed into or provided with the downstream path. According to the techniques described herein, these legacy control signals may be up-converted to a desired RF frequency. This may be accomplished by a stand-alone device or by the CMTS 170. The HEF 110 is coupled to the Internet 180, content providers 183, and Public Switched Telephone Network 186, to provide media content and services to customers 140(1) and 140(2). Also shown are traditional cable television (CATV) RF spectrum 190 and a new RF spectrum 195 for employing the techniques described herein.

The HEF 110 is connected to various content providers 183 for providing media content (e.g., movies, television channels, etc.). The media content is distributed by HEF 110 to hubs 120(1)-120(m) via a network of optical fibers, e.g., via a synchronous optical network (SONET) or synchronous digital hierarchy (SDH) network. Other networking technologies may be employed for content distribution. The content is further distributed by hubs 120(1)-120(m) to plurality of nodes. In this example, hub 120(1) distributes content to nodes 130(1)-130(n). Node 130(1) distributes the content to home gateway 150 in the form of conventional digital or IP television and node 130(n) distributes the content to legacy STB 160 in the form of conventional digital or analog video.

The HEF 110 is coupled to Internet 180 and PSTN 186 for providing Internet and telephony services (e.g., to and from customer 140(1) and 140(2)). Media content may also be distributed by content providers 183 via Internet 180. Each of the hubs 120(1)-120(m) may also be coupled to Internet 180 and PSTN 186.

The home gateway 150 operates as a bridge between the cable network and the home network (not shown) for providing media and data services (e.g., Internet, telephony, IP television services, etc.). Home gateway 150 is DOCSIS/EuroDOCSIS compliant (version 3.0 or greater). Home gateway 150 is configured to use a larger upstream RF spectrum 195 (for example, 5-200 MHz) while legacy STB 160 is configured to use the traditional CATV RF spectrum 190.

The traditional CATV RF spectrum 190 has, e.g., a 5-42 MHz reverse or upstream band in the United States or a 5-65 MHz upstream band in Europe, a guard band, and a forward or downstream band. The downstream band is 54 MHz on the low side to 550, 750, 862, or 1002 MHz on the high side, depending on the implementation. Traditional or legacy STBs are programmed via an out-of-band (OOB) 2 MHz control channel in the 70-130 MHz region of the CATV forward band. In some implementations, the OOB control channel ranges from 2-6 MHz, which may include three 2 MHz control channels. The control frequency is usually set to 75±1 MHz which is at a gap between legacy analog television channels four and five.

The new RF spectrum 195 is one of several schemes that are under consideration by the cable industry to extend the DOCSIS upstream bandwidth as part of the DOCSIS advanced MAC-PHY (AMP) initiative. The scheme shown in new RF spectrum 195 extends the upstream spectrum from the current 5-42 MHz to 5-200 MHz (or similar frequency choice) and changes the downstream spectrum from 50-870 MHz to 250 MHz-1 GHz (or similar frequency choice). This option is referred to the in cable industry as "High-Split". Other options include extending the upstream spectrum into the 1-2 GHz range. High-split is favored from a technical viewpoint because it would be cheaper to deploy than higher frequency up-conversion options due to the cost of components that operate at higher frequencies.

High-split has a major drawback from a deployment viewpoint, namely that high-split eliminates the 70-130 MHz legacy downstream OOB signaling bandwidth used for legacy STBs. As a result, most if not all of the legacy STBs would have to be replaced before even 1% of a Hybrid Fiber Coax (HFC) plant, e.g., HEF 110 or hubs 120(1)-120(m), can be upgraded to 200 MHz high-split. The reason that not all of the legacy STBs would not need to be replaced is that some of the newer legacy STBs support frequencies above 200 MHz. This 200 MHz upgrade scenario becomes untenable because it is not always possible to upgrade 100% of legacy STBs. The techniques described herein solve the legacy downstream OOB signaling channel problem by re-creating the OOB control channel in another area of the spectrum both during and after the 200 MHz AMP plant upgrade.

Figure 2:
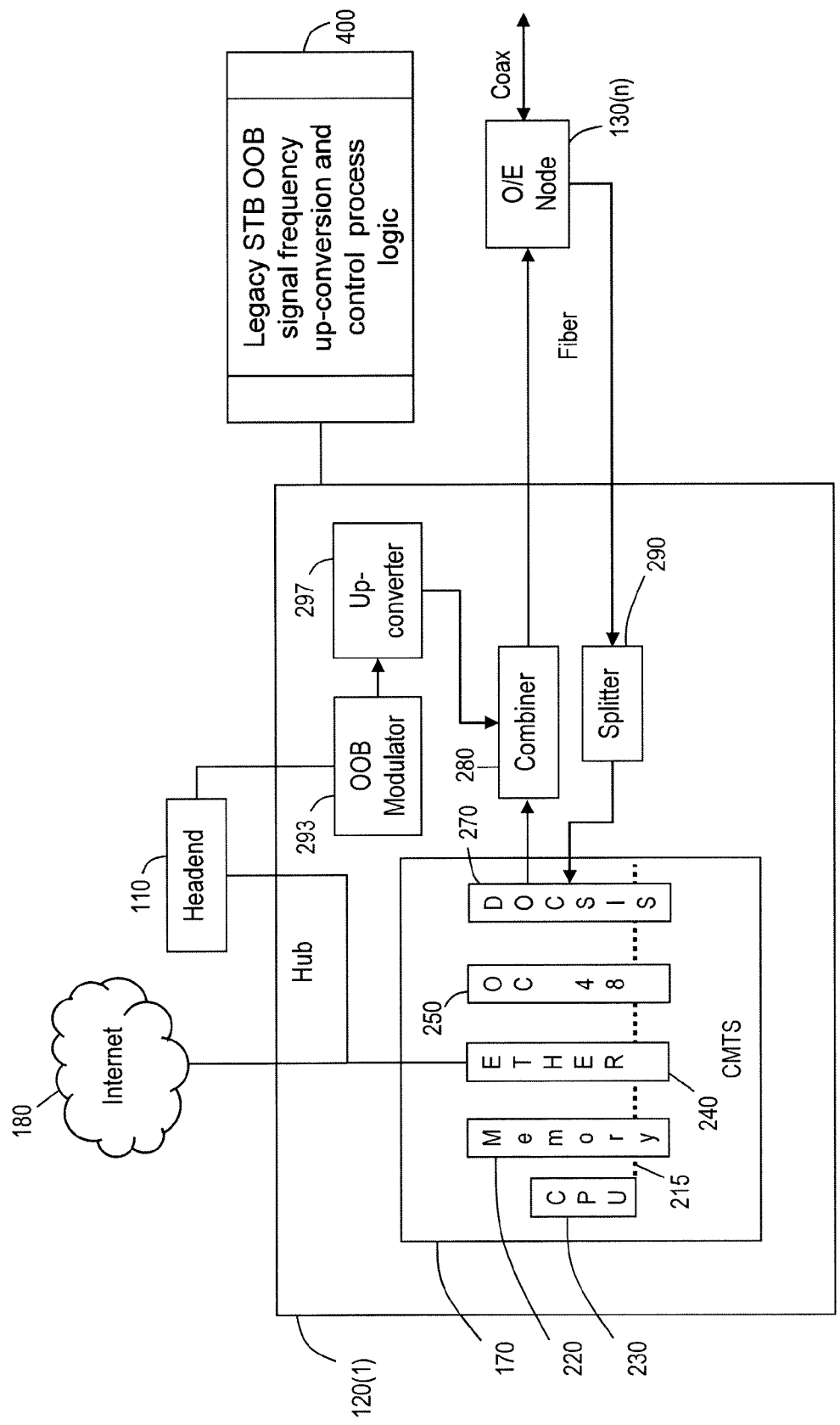
FIG. 2 is an example block diagram of a hub within the system of FIG. 1 with a cable modem termination system (CMTS) that is configured to perform legacy STB OOB control signal frequency up-conversion.

Referring to FIG. 2, and with continued reference to FIG. 1, an example block diagram of a hub, e.g., hub 120(1) within the system 100 is shown that is configured to perform legacy OOB up-conversion via legacy STB OOB control signal frequency up-conversion and control process logic 400. Hub 120(1) further contains the CMTS 170, a combiner 280, a splitter 290, an OOB modulator 293, and an up-converter 297.

In this example, the headend 110 sends control signals to the OOB modulator 293. The OOB modulator 293 modulates the control information onto a legacy downstream OOB signaling channel, e.g., a 2-6 MHz channel in the 70-130 MHz range. The up-converter 297 up-converts the legacy downstream OOB signaling channel to a frequency in the newer DOCSIS downstream band shown at 195, e.g., the OOB signaling channel is up-converted to the 250 MHz to 1 GHz frequency range or the 1-2 GHz frequency range, depending on the desired implementation, of which the actual frequencies may be programmable system wide. This process is referred to as the legacy STB OOB control signal frequency up-conversion and control process logic 400, or process logic 400.

Briefly, the process logic 400 controls how and what frequency is used for control signal frequency up-conversion, and what modulation scheme is employed for transmitting the legacy STB OOB control signals. It should be noted that the up-converted control signal(s) is injected at a convenient point in the downstream and not necessarily through combiner 280. The process logic 400 may also program remotely addressable devices that perform down-conversion and legacy STB OOB control signal injection. Any hub in system 100 (or HEF 110) may include hardware and software provisioned to implement process logic 400 and may be configured in a manner similar to hub 120(1)

Combiner 280 combines the up-converted signal with various analog and digital signals for transport to customers, e.g., customer 140(2), via an optical/electrical (O/E) node 130(n). Splitter 290 splits the signal coming from O/E node 130(n) into various components. O/E node 130(n) communicates via optical fiber to hub 120(1) and via coaxial (coax) cable to customer premise 140(2), and as such the combination of fiber and coax is known as a hybrid fiber coax (HFC) network (any combination of fiber, coax, Ethernet cable, may be used anywhere in system 100 (FIG. 1)). O/E node 130(n) may reside anywhere between hub 120(1) and customer premise 140(2), or alternatively, coax may connect hub 120(1) to customer premise 140(2) without using optical fiber.

CMTS 170 is used to provide high speed data services including cable Internet, voice over IP (VoIP), and IP television services to various subscribers. CMTS 170 comprises a central processing unit (CPU) or data processing device 230, a memory unit 220, and Ethernet unit 240. CMTS 170 may also house an optical carrier (OC) unit 250, and a DOCSIS 3.0 (or greater) unit 270. Memory unit 220 stores data and/or software or processor instructions that are executed to operate the CMTS.

Units 220-270 may be circuit or line cards with embedded software or firmware that plug into a common chassis and communicate over a common fabric or switched fabric 215 (e.g., a peripheral component interconnect (PCI) bus), or units 220-270 may be implemented by any conventional or other computer systems preferably equipped with a processor, memories and/or internal or external communications devices (e.g., modem, network cards, etc.).

Optical carrier unit 250 may communicate with various components external to CMTS 170 using SONET, SDH, or other protocols, such as OC-48 or OC-192 (in the U.S. and Canada), and STM-16 or STM-64 (outside of the U.S. and Canada). Ethernet unit 240 may be used for backhaul communication with the headend 110. DOCSIS unit 270 is the CMTS 170 interface to customers for digital data signals communicated between CMTS 170 and DOCSIS capable devices at the customer premise.

Figure 3A:
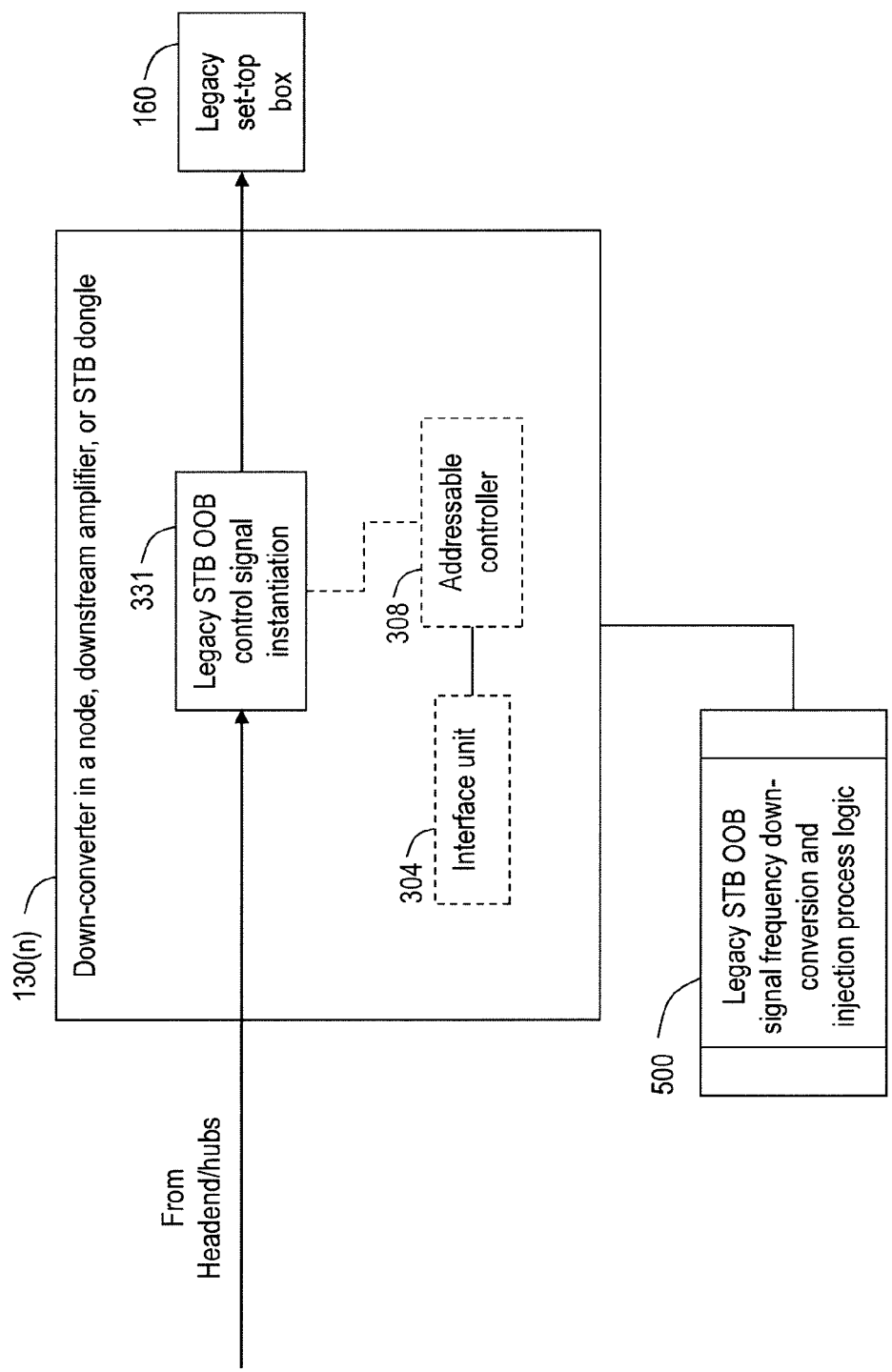
FIG. 3a is an example block diagram of a basic architecture of a system with a node, downstream amplifier, or STB dongle (a portable pluggable device) that is configured to perform legacy STB OOB control signal frequency down-conversion.

Referring to FIG. 3a, an example block diagram of a basic architecture of a system with a node (e.g., node 130(n)), downstream amplifier, or STB dongle is shown that is configured to down-convert legacy STB OOB control signals to an original frequency range, e.g., the 70-130 MHz range, that is usable by legacy STBs, e.g., legacy STB 160. Node 130(n) is used for ease of description of FIG. 3a with respect to nodes, amplifiers, or dongles. The node 130(n) has a legacy STB OOB control signal instantiation module 331, which may comprise, e.g., an OOB legacy frequency down-converter or a CM, and may be equipped with an optional addressable controller 308, and an interface unit 304; optional being indicated by the dashed boxes. The same basic configuration applies to a downstream amplifier or a STB down-converter dongle that can be coupled to the back of an STB (a dongle being a small portable device that is pluggable or connectable much like a Universal Serial Bus (USB) flash drive). The node 130(n) is configured to carry out a legacy STB OOB control signal frequency down-conversion and injection process logic 500. The process logic 500 will be described in greater detail in connection with FIG. 4 along with process logic 400.

The addressable controller 308 may be a microcontroller, processor, field programmable gate array (FPGA), application specific integrated circuit (ASIC), and the like. The addressable controller 308 is configured to tune or program a down-converter to the up-converted control signal frequency (e.g., channel 109) or set the down-conversion frequency (e.g., channel 1), or both. Memory may be provided to facilitate the techniques described herein that is separate or part of the controller 308. Any form of non-transitory tangible or computer readable media may be provided, e.g., random access memory (RAM) or flash memory. The interface unit 304 may be equipped with a wireless (e.g., Wi-Fi®/WiMAX®) or wired network interface (e.g., Ethernet) so that frequency control programming information or packet based information may be exchanged, e.g., OOB signaling packets may sent downstream to the legacy STB 160 or get backhauled upstream using IP over the connecting network. The interface unit 304 may be configured to receive DOCSIS Set Top Gateway (DSG) over DOCSIS or otherwise communicate via DOCSIS.

Figure 3B:
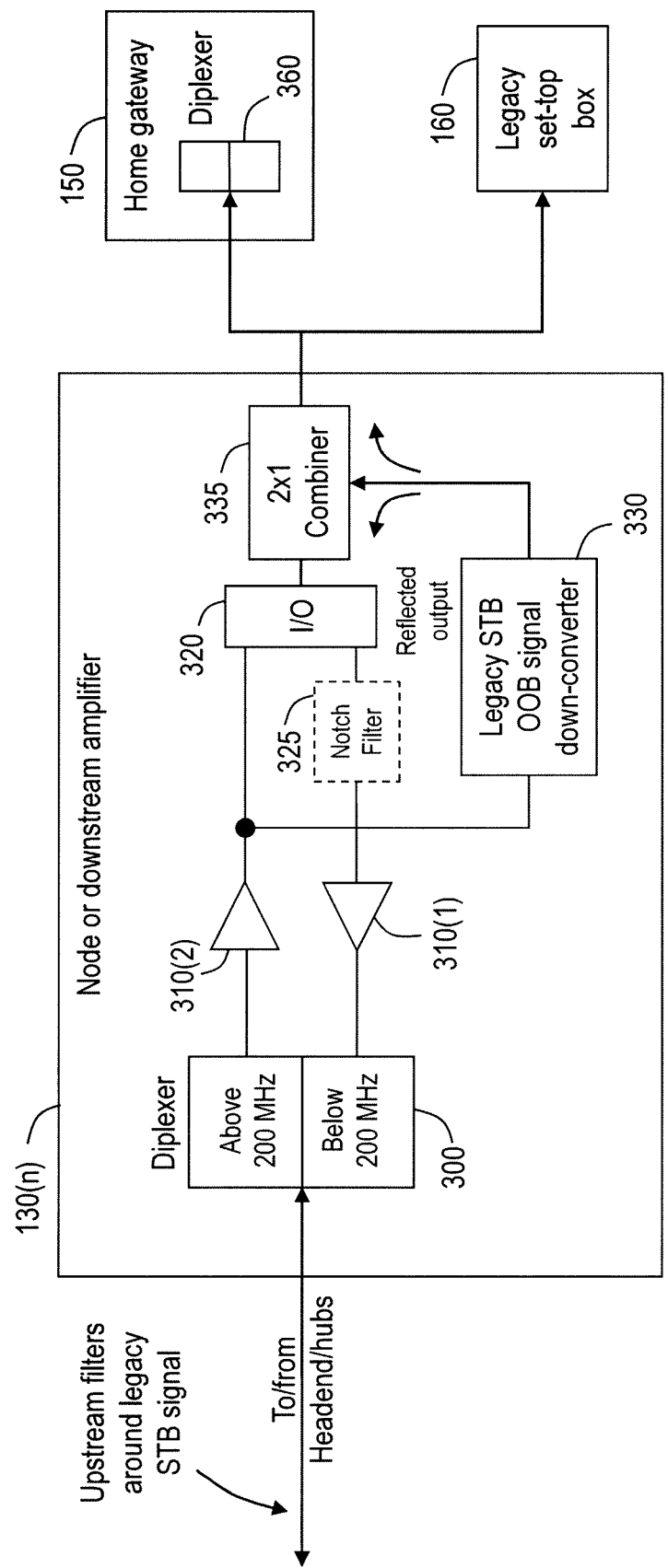
FIG. 3b is an example block diagram of the architecture of the system in FIG. 3a is shown for a node or downstream amplifier configuration.

Referring to FIG. 3b, an example block diagram of the architecture of the system in FIG. 3a is shown for a node or downstream amplifier configuration. The block diagram for node 130(n) is also comparable to a block diagram for a downstream amplifier that is an active device, as opposed to a passive device. Node 130(n) has a diplexer 300, an upstream amplifier 310(1), a downstream amplifier 310(2), an Input/Output (I/O) module or unit 320, legacy STB OOB control signal down-converter 330, and a combiner 335.

In this example, a downstream signal enters node 130(n) from the left by way of an input port. Node 130(n) has already been upgraded for the 200 MHz high-split and is configured with the 200 MHz diplexer 300. Accordingly, any signal entering node 130(n) from the left that is above 200 MHz will pass through diplexer 300 into the node. It is important to note that the selection of frequencies shown on the various figures with respect to diplexers may be based on frequencies selected by the operator for the high-spilt implementation or may representative of frequencies recommended by CableLabs®. The passed signals are subsequently amplified by downstream amplifier 310(2). The amplified signal passes to I/O module 320 and then to a 2×1 RF combiner 335. I/O module 320 may contain any combiners, splitters, diplexers, duplexers, or any other I/O hardware necessary to interface with operator or customer devices.

Either before or after downstream amplifier 310(2) a portion of the downstream signal is tapped by legacy STB OOB control signal down-converter 330. The down-converter 330 down-converts the up-converted legacy STB OOB control signal to a frequency that is usable by legacy STB 160. The down-converted legacy STB OOB control signal is injected, e.g., via RF combiner 335, into the downstream communication pathway to legacy STB 160. The legacy STB 160 can thereby be controlled by the headend or other control unit even after the 200 MHz high-split upgrade. The injected legacy STB OOB control signal does not affect the home gateway 150, because it is also configured with a 200 MHz diplexer 360 that operates in a similar fashion as diplexer 300.

The injected down-converted legacy STB OOB control signal may also travel upstream because part of the signal is reflected upstream into the 5-200 MHz upstream bandwidth. Any upstream devices may have to compensate for the down-converted legacy STB OOB control signal, e.g., by using a notch filter to notch around down-converted legacy STB OOB control signal frequency. In this example, an optional (as indicated by the dashes box) notch filter 325 is shown just prior to the upstream amplifier 310(1). Alternatively, the notch filter 325 or other filters in addition to notch filter 325 may be placed elsewhere within the upstream path (or downstream path to filter for any other RF leakage). In addition, the down-converted legacy STB OOB control signal is now in the downstream path for any other inline nodes or downstream amplifiers. By virtue of the 200 MHz high-split upgrade, downstream devices may be equipped with 200 MHz diplexers, e.g., diplexer 300, and any signals below 200 MHz will be blocked by the diplexer, thereby requiring another down-conversion should one be needed. Thus, if node 130(n) were configured as a downstream amplifier, any previously injected legacy STB OOB control signals would be blocked and subsequently regenerated by a legacy STB OOB control signal down-converter within any subsequent nodes or downstream amplifiers.

Figure 3C:
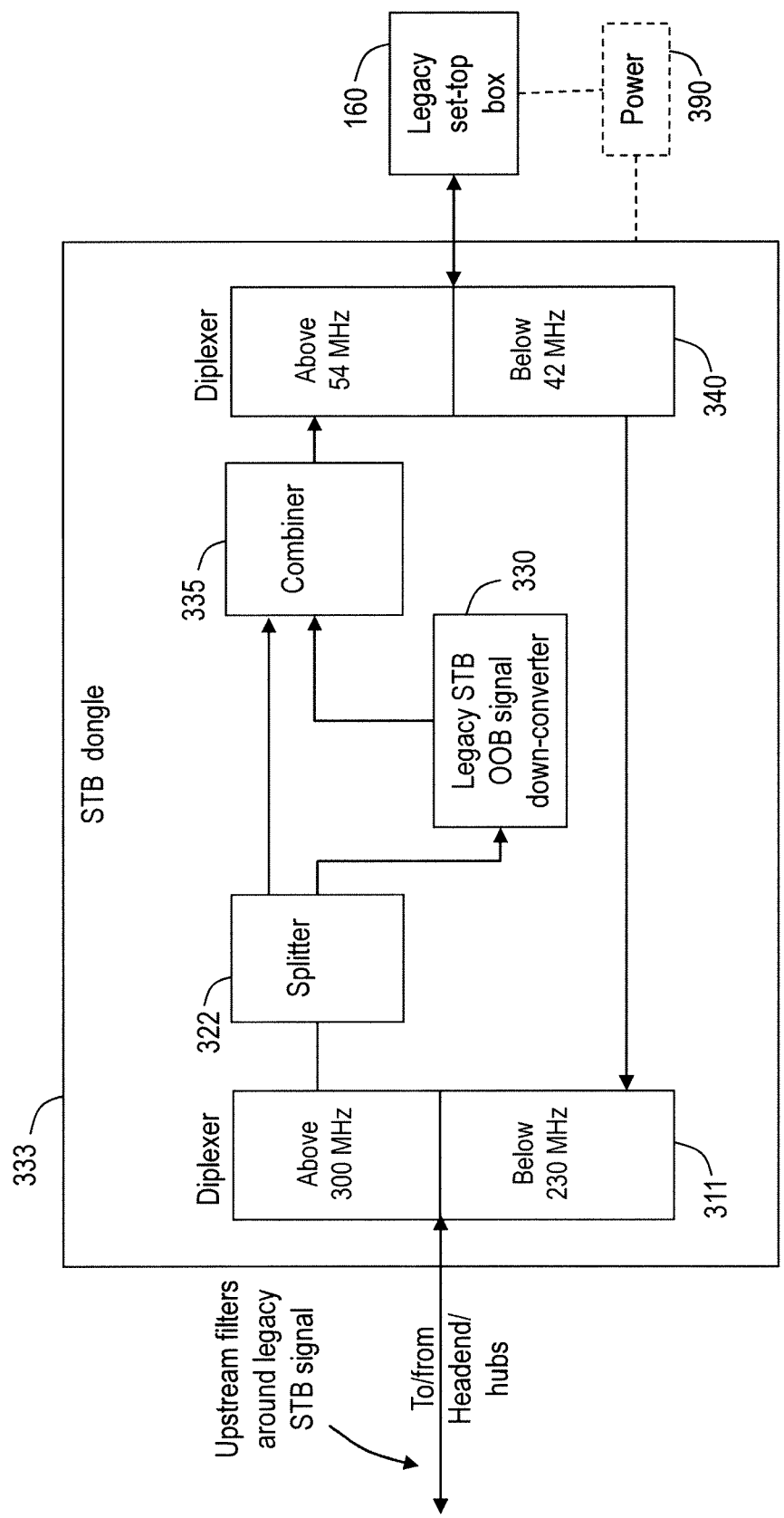
FIG. 3c is a first example block diagram of the architecture of the system in FIG. 3a in the dongle configuration.
Figure 3D:
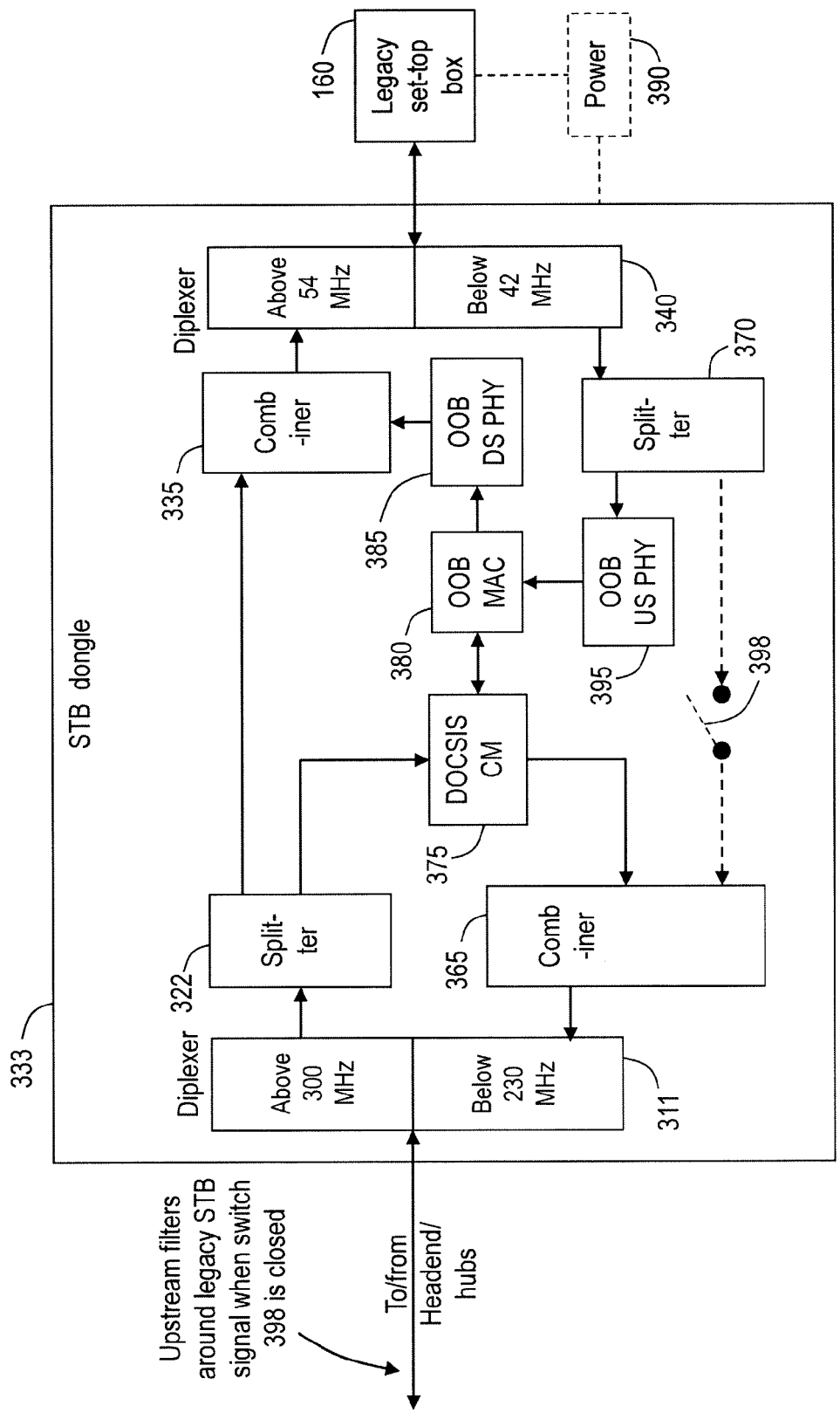
FIG. 3d is a second example block diagram of the architecture of the system in FIG. 3a in the dongle configuration.

The legacy STB OOB control signal down-converter 330 need not be housed within a node or downstream amplifier. This implementation is illustrated in FIGS. 3c and 3d. Referring to FIG. 3c for a first dongle example, legacy STB OOB control signal down-converter 330 is coupled between node 130(n) and legacy STB 160 as part of a dongle 333. For example, the legacy STB OOB control signal down-converter 330, may be installed outside the customer premise or in series with the coax to the legacy STB 160 within the home, e.g., the legacy STB OOB control signal down-converter 330 could be installed by a technician or by the customer. Another alternative would be to have this solution included in a home gateway device designed to support a legacy STB in the home.

The dongle 333 comprises a first diplexer 311, a splitter 322, a combiner 335, down-converter 330, a second diplexer 340, legacy STB 160, and an optional power supply 390; optional being indicated by the dashed boxes. Diplexer 311 passes downstream RF signals above 300 MHz and passes upstream signals below 230 MHz, with the difference between 300 MHz and 230 MHz indicating one example implementation of a guard band (e.g., as shown in spectrum 195 from FIG. 1). Diplexer 340 passes downstream signals above 54 MHz and passes upstream signals below 42 MHz (e.g., upstream control signals); thereby implementing the natural frequency separation used in one example of legacy STB systems.

Splitter 322 splits the signals above 300 MHz into a first path coupled directly to combiner 335 for conventional and upgraded media content and data, e.g., internet, IP telephone, and cable television, and a second path coupled to legacy STB OOB control signal down-converter 330 for legacy OOB downstream signaling. Thus, legacy STB OOB control signal down-converter 330 may be configured as a small embedded device that is addressable and programmable and/or RF tunable via a CMTS (or another other hub or head end device) in much the same way that legacy STB 160 or a CM is programmed to receive a particular legacy STB OOB control signal on a particular frequency. For example, the down-converter could be made with a cable modem back-end so that it is discoverable and addressable entity on the network, as will be described in connection with FIG. 3*d*. Thus, legacy STB OOB control signal down-converter 330 may be programmed to down-convert the legacy STB OOB control signal to the same frequency that legacy STB 160 is programmed to receive control functions. Alternatively, the down-converter could be at a fixed frequency and not addressable.

At the headend, the OOB signal has been up-converted from, e.g., 75 MHz, to a frequency that exists in the downstream spectrum. Typically, a 2, 4, or 6 MHz band will be unconverted that may carry several carriers, as mentioned above. For example, 72 to 78 MHz (channel 1) might be up-converter to 702 to 708 MHz (channel 109). The down-converter 330 could be preset to channel 109 or programmed to a frequency via a controller, e.g., an addressable controller 308 (FIG. 3*a*). The network (headend) side, as shown on the left side of the figure, has the upgraded upstream spectrum. In this example, the upstream spectrum could be 5 to 230 MHz while the downstream would be 300 MHz to 1000 MHz as another example of spectrum 195 (FIG. 1).

The downstream signal enters the diplexer 311 by way of an input port, e.g., a standard cable industry coaxial connector. The diplexer 311 splits out the high frequency spectrum and sends it to the splitter 322. The diplexer 311 will block any energy from the upstream spectrum (<230 MHz) on the network side from entering the legacy downstream. The output of the splitter 322 goes to combiner 335 and down-converter 330. Down-converter 330 receives the up-converted OOB signal from splitter 322, down-converts the 2-6 MHz wide OOB signals back to their original spectrum, e.g., 70-130 MHz, and passes the signal to combiner 335, where the OOB signal is recombined with the spectrum from splitter 322. The output of combiner 335 goes to diplexer 340 where it is forwarded to legacy STB 160.

Diplexer 340 further splits out the legacy upstream band and sends it to diplexer 311 which, in turn, forwards the legacy upstream band back into the network side coax interface. The legacy upstream frequency is 5-42 MHz in North America as shown in FIG. 1, but varies depending on the legacy implementation. The entire dongle 333 may be unpowered or could be powered from a USB port from the STB via a USB connection, or via a power supply or adapter, e.g., power supply 390. The dongle 333 may comprise amplifiers at various points such that there is no net signal loss for either upstream or downstream signals.

Turning now to FIG. 3*d* for a second dongle example, a DOCSIS CM 375 is coupled between node 130(*n*) and legacy STB 160 as part of dongle 333. As in FIG. 3*c*, dongle 333 includes diplexer 311, splitter 322, combiner 335, diplexer 340, legacy STB 160, and an optional power supply 390; optional being indicated by the dashed boxes. In this example, dongle 333 also includes a second splitter 370 and combiner 365, and DOCSIS CM 375 coupled to a Media Access Control (MAC) layer 380, which in turn, is coupled to OOB downstream (DS) physical (PHY) layer 385 and OOB upstream (US) PHY layer 395.

Splitter 322 splits the signals above 300 MHz into a first path coupled directly to combiner 335 for conventional and upgraded media content and data, e.g., internet, IP telephone, and cable television, and a second path coupled to DOCSIS CM 375 for legacy OOB downstream and upstream signaling. DOCSIS CM 375 converts OOB control packets carried over DOCSIS and delivers them in the OOB downstream, and converts OOB packets in the upstream and delivers them to the DOCSIS upstream using packet-based technology, e.g., using encapsulated IP. For example, the CM 375 may convert between DSG over DOCSIS and the native OOB environment used by the legacy STB 160.

To achieve the conversions, CM 375 communicates with OOB MAC 380 using a layer 2 link, e.g., an Ethernet link. In turn, MAC 380 is coupled to DS PHY 385 and US PHY 395 to obtain the packet transmission and packet reception media conversions, i.e., packet-to-RF conversions and vice versa. Optionally, as indicated by dashed lines, dongle 333 includes a switch 398. Switch 398 may be open when US signaling is used by way of DOCSIS CM 375 or closed when conventional 5-42 MHz upstream signaling is used or desired. Switch 398 may be physical switch that is switchable by a user or programmable by way of a downstream signal. The circuitry shown in FIGS. 3*b*, 3*c*, and 3*d* may be interchanged among the various depictions in the figures to achieve any desired variations in implementation of the techniques described herein, e.g., any component may also be used in headend 110, CMTS 170, or node 130(*n*) as shown in FIG. 1 or 2.

In summary, dongle 333 (or hub/DS amplifiers) performs two functions. First, it down-converts the OOB channel(s) or other signaling to an original legacy frequency for use with the legacy STB 160, and second, it prevents any unwanted energy from entering and interfering with the legacy downstream, e.g., other high-split or legacy upstream signals, as well as high power upstream CM signals that operate in the 150 MHz region that can saturate legacy signal processing. For example, dongle 333 prevents a high powered DOCSIS upstream carrier at 100 MHz from getting to the STB 160 and saturating the downstream receive circuits, which in turn could interfere with reception or even cause damage to STB 160.

The embodiments shown in FIGS. 3*c* and 3*d* may also be an option when the STB is expected to only receive video and data above 250 MHz (which may be referred to as a "top-split"), receive a 75 MHz OOB channel, and to generate a return channel that is typically below 20 MHz (although diplexer 340 passes signals up to 42 MHz). STBs with such a design allow for inexpensive filtering to be used.

Turning now to FIG. 4, the legacy STB OOB control signal frequency up-conversion and control process logic 400, and the legacy STB OOB control signal frequency down-conversion and injection process logic 500 will now be described. The process logic 400 is indicated by solid boxes while the process logic 500 is indicated by dashed boxes, the process logic 400 being performed by a headend device, e.g., a CMTS, and the process logic 500 being performed by an endpoint device, e.g., by an OOB control signal down-converter.

At 410, a STB and an OOB control signal down-converter are programmed or set to a common control frequency, e.g., 75 MHz in the STB control band, e.g., the legacy STB control band from 70-130 MHz, as described above. The common control frequency allows the OOB control signal down-converter to down-convert the STB control signal to the proper frequency for legacy STB control. Alternatively, the OOB control signal down-converter is manufactured with a predetermined down-conversion frequency that is known to the cable system operator and programmed into the legacy STBs. At 420, the downstream OOB STB control signal is up-converted to a frequency that is above a cable television system upstream communications band. The up-conversion process may require that the original OOB STB control signal be down-converted to baseband prior to up-conversion.

Multiple OOB control channels may be supported. In one example, two 2 MHz OOB control channels are generated at the cable operator's headend with legacy OOB equipment. They are both placed into one 6 MHz band (RF channel) and up-converted into the higher spectrum above 250 MHz. Alternatively, the original or legacy OOB modulator/up-converter could be simply replaced with an OOB modulator/up-converter that could up-convert the OOB control channels above 250 MHz. In this way, one OOB control channel can be used for a first vendor's equipment, e.g., a Cisco® STB, and a second OOB control channel can be used for a second vendor's equipment, e.g., a Motorola® STB. The two 2 MHz OOB control channels may be placed on the 6 MHz RF channel with a 1 MHz guard band in between. Alternatively, three 2 MHz OOB control channels could be placed on the 6 MHz RF channel. In Europe, four 2 MHz OOB control channels may be placed on an 8 MHz European RF channel. These examples are not limited to conventional cable RF channels, e.g., a 10 MHz band may be employed. However, for ease, conventional RF channels may be used.

Accordingly, up-converting may be from baseband or from the set-top box control band to a frequency in cable television system downstream communications band. Alternatively, legacy STB control signal or information may be encapsulated, e.g., in packets, for transmission on a DOCSIS RF channel.

At a downstream device, the process logic 500 begins. At 510, the downstream STB control signal is down-converted to the common control frequency in the STB control band. At each passive segment of the plant which contains subscribers with legacy STBs, a down-converter is used to bring the signals back to the common control frequency, e.g., 75 MHz. This down-conversion may require down-converting to baseband and then up-converting back to 75 MHz. Other subscriber or customer equipment, e.g., cable modems, would be programmed to avoid using the frequency range around 75 MHz. The CMTS would ignore the 75 MHz range as well. A passive segment is defined as a coax segment located between amplifiers or after the last amplifier in a series that has a subscriber attached to it by means of a drop cable.

As part of the planned 200 MHz AMP upgrade, all fiber nodes, amplifiers, line extenders, and line equalizers, etc., will have been upgraded. At upgrade time, a down-converter can be added into the housing of the nodes or downstream amplifiers. The down-converter may also be added directly to a plant passive segment.

At 520, the downstream STB control signal is injected into a STB communications pathway, e.g., by combiner 335, to the legacy STB 160. When the 75 MHz signal is injected, it will travel in both directions along the coax as shown in FIG. 3b, but will be slightly attenuated (~10 dB) in the reverse direction due to the return loss of splitter, etc., e.g., splitter 290 (FIG. 2). The 75 MHz signal that propagates down the plant will either reach the end user or it will get blocked by the next active element, e.g., a downstream amplifier with a blocking diplexer. In the latter case, the signal is regenerated after the active device via a new down-converter, as described above. As the 75 MHz signal travels upstream, it will become part of the upstream spectrum and will need to be ignored by the CMTS. When a notch filter, e.g., notch filter 325, is inserted into the upstream pathway, the splitter and notch filter combination, as well as signal level of the injected STB control signal, may be considered and designed so as not to produce interference with other STB control signals generated elsewhere in the upstream path.

If there is a scenario where multiple copies of the downstream control signal gets added and accumulated at subsequent upstream segments, then additional energy may have to get notched out at the fiber node prior to laser transmission into the fiber portion of the network. Otherwise, the cumulative energy of the signal at 75 MHz may overload the upstream equipment. One way to avoid the accumulation of signal power is to use an ingress carrier cancellation technique at each active node. The active node will have an exact copy of the OOB carriers that it is injecting into the coax segment. Once the node receives the upstream spectrum (e.g., 5-200 MHz), it can subtract the known carrier from the upstream spectrum to create an upstream spectrum that has a substantially reduced power for an upstream carrier at 75 MHz. The amount of attenuation will depend upon how well balanced the cancellation circuit is.

In summary, a copy of the OOB control channel is sent onto the HFC Plant at a high frequency and then is down-converted on each local passive plant segment. Carrier cancellation techniques may be applied in the upstream direction and techniques to re-inject the FM band in addition to the OOB signals may be applied. Without an OOB replacement, the planned 200 MHz AMP upgrade may not be feasible due to equipment cost or due to customer resistance. An alternative and more expensive solution is to use create additional upstream bandwidth above 1 GHz. The solution described herein allows the 200 MHz solution to be implemented with lower cost, but also enables solutions for spectrum above 1 GHz.

Thus, down-conversion may be made to a legacy downstream control frequency or the downstream device may include cable modem functionality configured to decapsulate (i.e., obtain the native packets) or otherwise extract set-top box control signal information from a DOCSIS RF channel, and the set-top box control signal information may be conditioned for transmission to the set-top box, e.g., the control packets may be transmitted via corresponding down-conversion frequency or using out-of-band set-top box signaling or communications protocol.

From the foregoing description, it will be appreciated that embodiments described herein make available a novel method, apparatuses, and system for DOCSIS OOB control signal frequency conversion for legacy STBs, wherein the method, apparatuses, and system enable a cable system operator or multi system/service operators (MSOs) in cable system environment to upgrade to DOCSIS 200 MHz high-split (or variants thereof) without having to replace of the legacy STBs associated with a particular HFC plant.

Having described preferred embodiments of new techniques for DOCSIS 200 MHz OOB control signal frequency conversion for legacy STBs, it is believed that other modifications, variations and changes will be suggested to those skilled in the art in view of the teachings set forth herein. It is therefore to be understood that all such variations, modifications and changes are believed to fall within the scope defined by the appended claims.

The above description is by way of example only.

What is claimed is:

1. A method comprising:
   at an upstream device, up-converting a first downstream set-top box control signal to a two to eight megahertz (MHz) control channel at a frequency that is above a cable television system upstream communications band such that a resulting up-converted set-top box control channel is at a frequency that is above a guard band for the cable television system upstream communications band and greater than 200 MHz; and transmitting the up-converted set-top box control channel using a downstream communications band.

2. The method of claim 1, wherein up-converting comprises one of up-converting from baseband or up-converting from the set-top box control band, wherein the set-top box control band comprises a frequency range from 70 MHz to 130 MHz.

3. The method of claim 1, wherein up-converting comprises up-converting to a frequency selected from the group including a frequency in a cable television system downstream communications band, a frequency above the cable television system forward communications band, and a frequency greater than 1002 MHz.

4. The method of claim 1, wherein up-converting comprises encapsulating the first downstream set-top box control signal using Data-Over-Cable Service Interface Specification (DOCSIS) for transmission over a radio frequency (RF) channel in a cable television system downstream communications band.

5. The method of claim 1, further comprising:
up-converting a second downstream set-top box control signal for transmission over the up-converted set-top box control channel; and
transmitting the second up-converted set-top box control signal using the up-converted set-top box control channel.

6. A method comprising:
at a downstream device, down-converting a previously up-converted downstream set-top box control signal to a frequency in a set-top box control band, wherein the previously up-converted downstream set-top box control signal comprises a two to eight megahertz (MHz) control channel at a frequency that is above a guard band for a cable television system upstream communications band such that the up-converted set-top box control channel is at a frequency that is greater than 200 MHz; and
injecting the downstream set-top box control channel into a set-top box communications pathway.

7. The method of claim 6, wherein down-converting comprises down-converting to the set-top box control band in a 70-130 MHz frequency range.

8. The method of claim 6, wherein the downstream device includes a remotely addressable device that is remotely programmed with a down-conversion frequency.

9. The method of claim 6, wherein the downstream device includes cable modem functionality to decapsulate set-top box control signal information from a Data-Over-Cable Service Interface Specification (DOCSIS) radio frequency (RF) channel, and the method further comprising conditioning the set-top box control signal information for transmission to the set-top box.

10. The method of claim 6, wherein the downstream device comprises a dongle-type device.

11. The method of claim 10, wherein the dongle-type device receives power from one of a Universal Serial Bus adapter, a power supply, and a power adapter.

12. An apparatus comprising:
an input port that:
receives a downstream set-top box control signal; and
one or more circuits that:
up-convert the downstream set-top box control signal to a two to eight megahertz (MHz) control channel at a frequency that is above a cable television system upstream communications band such that a resulting up-converted set-top box control channel is at a frequency that is above a guard band for the cable television system upstream communications band and greater than 200 MHz; and
inject the up-converted set-top box control channel into a downstream communications band.

13. The apparatus of claim 12, wherein the input port receives the downstream set-top box control signal at baseband or in the set-top box control band, and the one or more circuits up-convert the downstream set-top box control signal from one of baseband or the set-top box control band, wherein the set-top box control band comprises a frequency range from 70 MHz to 130 MHz.

14. The apparatus of claim 12, wherein the one or more circuits up-convert the downstream set-top box control signal to a frequency selected from the group including a frequency in a cable television system downstream communications band, a frequency above the cable television system forward communications band, and a frequency greater than 1002 MHz.

15. The apparatus of claim 14, further comprising a Data-Over-Cable Service Interface Specification (DOCSIS) network interface and the one or more circuits cause the up-converted downstream set-top box control channel to be transmitted on a DOCSIS radio frequency (RF) channel.

16. The apparatus of claim 12, wherein the one or more circuits:
up-convert a second downstream set-top box control signal for transmission over the up-converted set-top box control channel; and
transmit the second up-converted set-top box control channel.

17. A system comprising the apparatus of claim 12, further comprising an out-of-band set-top box (STB) control signal down-converter that down-converts the set-top box control channel to a frequency band within a 70-130 MHz frequency range.

18. The system of claim 17, wherein the out-of-band STB control signal down-converter receives programming instructions to set the downstream set-top box control channel down-conversion frequency or to tune to an up-conversion frequency.

19. An apparatus comprising:
one or more circuits that:
down-convert a previously up-converted downstream set-top box control signal to a frequency in a set-top box control band, wherein the previously up-converted downstream set-top box control signal comprises a two to eight megahertz (MHz) control channel at a frequency that is above a guard band for a cable television system upstream communications band such that the up-converted set-top box control channel is at a frequency that is greater than 200 MHz; and
inject the downstream set-top box control channel into a set-top box communications pathway.

20. The apparatus of claim 19, wherein the one or more circuits down-convert the set-top box control signal to a 70-130 MHz frequency range.

21. The apparatus of claim 19, wherein the one or more circuits receive programming instructions to set the downstream set-top box control signal down-conversion frequency and/or to tune to an up-conversion frequency.

22. The apparatus of claim 19, wherein the one or more circuits are housed in a dongle-type device.

23. The apparatus of claim 19, further comprising a power interface that receives power from one of a Universal Serial Bus adapter, a power supply, and a power adapter.

24. The apparatus of claim 19, further comprising one or more amplifiers that amplify signals passing through the apparatus.

25. The apparatus of claim 19, wherein the one or more circuits:
   extract control packets from previously up-converted downstream set-top box control signal without down-conversion; and
   transmit the control packets at a corresponding down-conversion frequency.

26. The apparatus of claim 25, further comprising an interface unit that:
   connects to a wired or wireless network; and
   transmits the control packets over the wired or wireless network.

27. The apparatus of claim 19, wherein the one or more circuits:
   extract control packets from a Data-Over-Cable Service Interface Specification (DOCSIS) radio frequency (RF) channel; and
   transmit the control packets comprising one of at a corresponding down-conversion frequency and using out-of-band set-top box signaling.

28. The apparatus of claim 19, further comprising an interface unit that:
   connects to a wired or wireless network; and
   receives control information to set the downstream set-top box control signal down-conversion frequency or to tune to an up-conversion frequency.

* * * * *

UNITED STATES PATENT AND TRADEMARK OFFICE
CERTIFICATE OF CORRECTION

PATENT NO. : 9,247,310 B2
APPLICATION NO. : 13/472691
DATED : January 26, 2016
INVENTOR(S) : Chapman et al.

Page 1 of 1

It is certified that error appears in the above-identified patent and that said Letters Patent is hereby corrected as shown below:

Title Page

(73) Assignee:, replace "Cisco Technologies, Inc." with -- Cisco Technology, Inc. --.

Signed and Sealed this
Tenth Day of May, 2016

Michelle K. Lee
*Director of the United States Patent and Trademark Office*